(12) United States Patent
Postnikov et al.

(10) Patent No.: US 10,753,818 B2
(45) Date of Patent: Aug. 25, 2020

(54) PIPELINE LEAK DETECTION DEVICE

(71) Applicants: JOINT STOCK COMPANY "ATOMENERGOPROEKT", Moscow (RU); JOINT STOCK COMPANY "SCIENCE AND INNOVATIONS", Moscow (RU)

(72) Inventors: Boris Alekseevich Postnikov, Moscow (RU); Zinaida Semyonovna Kazachkova, Moscow (RU); Yevgeniy Borisovich Mishin, Moskovskaya obl. (RU); Yelena Aleksandrovna Nikitina, Moskovskaya obl. (RU)

(73) Assignee: JOINT STOCK COMPANY "ATOMENERGOPROEKT", Moscow (RU)

( * ) Notice: Subject to any disclaimer, the term of this patent is extended or adjusted under 35 U.S.C. 154(b) by 303 days.

(21) Appl. No.: 15/579,464

(22) PCT Filed: May 25, 2016

(86) PCT No.: PCT/RU2016/000316
§ 371 (c)(1),
(2) Date: Mar. 27, 2018

(87) PCT Pub. No.: WO2016/195539
PCT Pub. Date: Dec. 8, 2016

(65) Prior Publication Data
US 2018/0195925 A1    Jul. 12, 2018

(30) Foreign Application Priority Data

Jun. 4, 2015   (RU) ................................ 2015121328

(51) Int. Cl.
*G01R 27/08* (2006.01)
*G01M 3/16* (2006.01)
(Continued)

(52) U.S. Cl.
CPC ............... *G01M 3/16* (2013.01); *F16L 59/10* (2013.01); *F17D 5/04* (2013.01); *G01M 3/18* (2013.01); *F16L 2201/30* (2013.01)

(58) Field of Classification Search
CPC ............... G01R 31/3292; G01R 31/36; G01R 31/3679; G01M 3/16; G01M 3/18;
(Continued)

(56) References Cited

U.S. PATENT DOCUMENTS

| | | | |
|---|---|---|---|
| 2010/0096021 A1* | 4/2010 | Keyes | F16L 59/143 137/15.01 |
| 2011/0005303 A1* | 1/2011 | Izumo | F16L 59/141 73/40.5 R |

(Continued)

*Primary Examiner* — Thang X Le
(74) *Attorney, Agent, or Firm* — Brandon V. Zuniga; James R. Gourley; Carstens & Cahoon, LLP

(57) ABSTRACT

The sphere of main pipelines used for hot water supply, specifically devices for electric surveillance control and water heat carrier leakage detection on atomic electric power station pipelines applied for operation of heat insulated pipes with a protective casing. Such pipeline leakage detection device uses a metal protective casing installed coaxially on a metal pipe with a radial clearance, where the casing performs as a joint of, for example, four arch shaped metal sheets bent across the pipe. Sheets straight line edges are joined by a dielectric washer, and sheets arch shaped edges are joined by a dielectric ring. Ring flanks have ring grooves on them for sheets arch shaped edges installation. Across each sheet arch shaped edge there are lamels shaped electric connectors installed in ring grooves for sheet arch shaped edge fixation. Electric connector terminals are fastened on the ring external surface and separately connected to each lamel.

4 Claims, 7 Drawing Sheets

Figure 1:
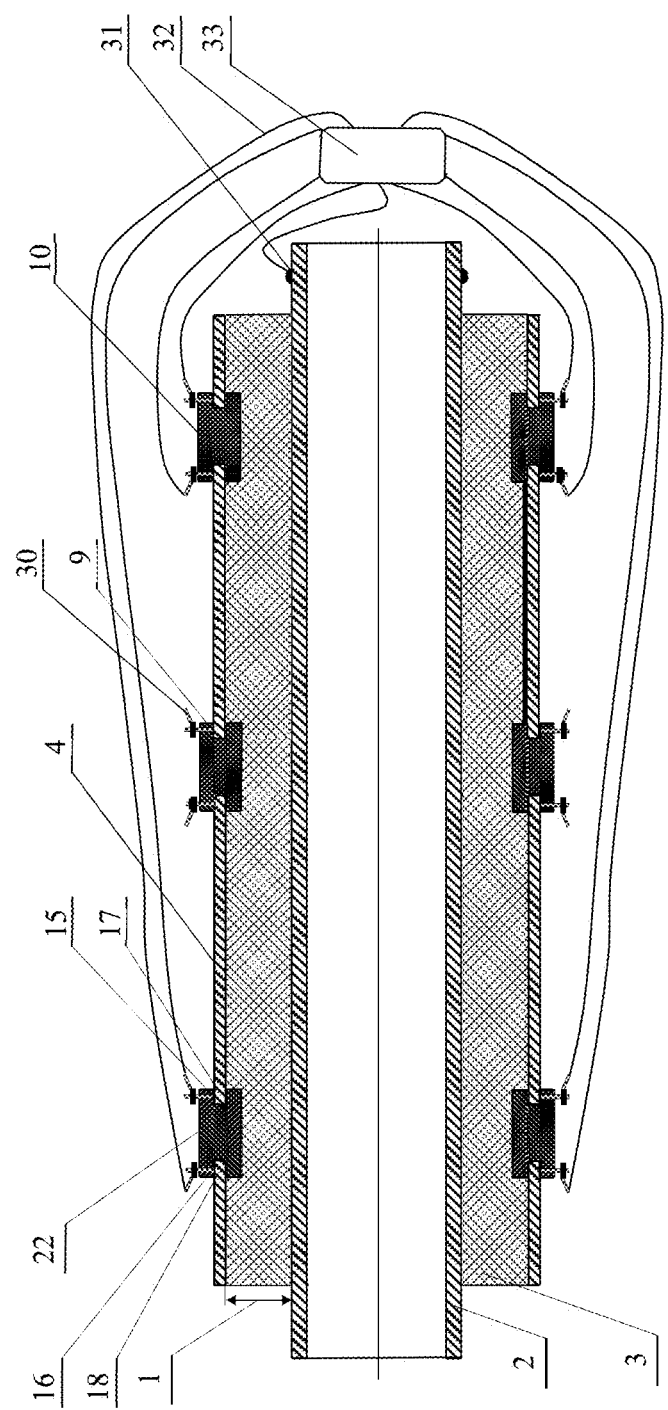

(51) Int. Cl.
*F17D 5/04* (2006.01)
*G01M 3/18* (2006.01)
*F16L 59/10* (2006.01)

(58) Field of Classification Search
CPC ........ G01M 3/40; G01M 3/2815; G05B 9/02; G05B 9/05; F16L 59/08; F16L 59/10; F16L 59/15; F16L 59/20; F16L 59/143; F16L 59/145; F16L 59/166
See application file for complete search history.

(56) References Cited

U.S. PATENT DOCUMENTS

| | | | | |
|---|---|---|---|---|
| 2012/0038912 | A1* | 2/2012 | Yamada | G01M 3/16 |
| | | | | 356/240.1 |
| 2013/0003501 | A1* | 1/2013 | Marquez | G01M 3/18 |
| | | | | 367/83 |
| 2016/0123833 | A1* | 5/2016 | Schwartz | G01M 3/18 |
| | | | | 137/487.5 |
| 2018/0217023 | A1* | 8/2018 | Hansen | G01M 3/40 |

* cited by examiner

PIPELINE LEAK DETECTION DEVICE

CROSS-REFERENCE TO RELATED APPLICATIONS

This application is a US 371 Application from PCT/RU2016/000316 filed Apr. 5, 2016, which claims priority to Russia Application 2015121328 filed Jun. 4, 2015, the technical disclosures of which are hereby incorporated herein by reference.

This invention relates to the sphere of main pipelines used for hot water supply, specifically to devices for electric surveillance control and water heat carrier leakage detection on atomic electric power station pipelines and can be applied for operation of heat insulated pipes with a protective casing.

The current electric system for technical performance detection on the main pipelines crossings with auto- and rail roads provides permanent control of electric voltage in the gap between the main metal pipeline and the metal protective casing, enclosing it, which are connected to anticorrosion cathode protection stations. If electric voltage within "main pipeline—protective casing" pair is beyond preliminary set threshold, then the electric voltage gradient is additionally measured along the protective casing and by its maximum spatial layout on the protective casing detect an electric contact point between the protective casing and the main pipeline. Technical result of the analysed invention provides an opportunity to localise electric contact between the main pipeline and its protective casing. (Ref. patent RU 2317479 C1, IPC F17 D5/00, priority of 9 Nov. 2006).

This electric system properly detects the contact between the main metal pipeline and the metal protective casing, enclosing it, and also warns of any undesirable mechanical influences on the main pipeline. But at the same time if leakage occurs, this electric system is useless for hazardous leakage localisation for it measures only electric voltage variation between the main metal pipeline and the whole metal protective casing, enclosing it.

The closest solution to the proposed one is the pipeline leakage detection device comprising a metal protective casing coaxially installed on a metal pipe with a radial clearance, electric contacts on the metal protective casing and measurement instrument with electric conductors connected to the metal pipe and electric contacts on the protective casing for measuring environmental electric resistance in the radial clearance between the pipe and the protective casing. (Ref. patent RU 2 264 578 U1, IPC F17 D5/00, priority of 11 Nov. 2004)

But this invention can detect only the fact of leakage existence on a separate longitudinal pipe section and only in the case when heat carrier which is an electric conductor fills up the gap between the pipe and the protective casing and makes electric contact in the pair "casing-pipe". Leakage localisation within the casing is not provided. This leakage control system will not react on the leakage existence in case of insufficient amount of heat carrier in the gap between the pipe and the casing to fill up the whole volume which emerges when the leakage is relatively small or heat carrier high temperature forces its quick evaporation. The last case is characteristic for pipelines on atomic electric power stations where heat carrier temperature can reach 350° C., and additionally the use of large diameter pipes makes it hard to fix any defects, especially when pipes are covered with thermal insulation material because the supposed leakage detection leads to the necessity of dismantling the considerable part of a protective casing, enclosing the pipe, and the whole insulation under the stripped casing part. Thus it is very desirable to have opportunity to localize the sufficiently accurate leakage point, to control leakages not only along radial but longitudinal pipe directions which will provide an opportunity of dismantling only limited casing segments and thermal insulation under them. When small leakage is originated in the pipe (leakage with a small flow rate of the heat carrier), then this heat carrier begins evenly spreading in thermal insulation in all directions radially and longitudinally, and hence heat carrier spread front in thermal insulation forms a sphere. As pipe temperature can reach 350° C., then not heat carrier itself but rather its vapour spreads along the thermal insulation and gets condensed near the casing whose surface temperature is not higher than 60° C. or on the casing itself. To be more precise, after thermal insulation has been soaked with heat carrier in radial direction, it starts soaking along the pipe and thus it is very desirable to register the very beginning of the fistula origination before the whole insulation gets wet and the earlier fistula origination is detected the more accurate is leakage detection.

This invention is aimed to improve accuracy in leakage detection for thermally insulated pipes covered with a protective casing by braking it down to several sectors.

The given object is resolved by means of device for pipeline leakage detection, comprising the metal protective casing coaxially mounted on the metal pipe with a radial clearance, electric contacts on the metal protective casing and a measurement instrument with electric conductors connected to the metal pipe and electric contacts on the metal protective casing for measurement of electric resistance in radial clearance environment, wherein there is a new protective casing design of separate metal sheets arch shaped segments bent across the pipe, whose straight line edges are connected with each other and with a dielectric washer and arch edges are connected with each other by means of a dielectric ring, wherein there is a ring groove on its flank for arch shaped sheet edges installation with electric contacts in it for each arch shaped sheet edge fixation and metal protective casing electric contacts installed on the outer surface of the ring which are connected to each electric connector separately.

In addition the dielectric washer and the ring can be designed with H-shaped cross-section.

In addition radial clearance between a metal pipe and a metal protective casing can be filled with thermal insulation.

In addition arch shaped metal sheets edges can be bent by contour.

Protective casing design of joined arch shaped metal sheets bent across the pipe provides a quick access to the leakage point, right from that side of the pipe where fistula has been originated and allows dismantle of only that protective casing segment and thermal insulation under it which is the closest in the radial direction to the fistula detected.

Straight line edges of the protective casing arch shaped metal sheets bent across the pipe are joined with each other by means of a dielectric washer and arch shaped edges of these sheets joints with dielectric ring which provides electric insulation of these metal sheets from each other.

Ring groove on a ring flank for arch shaped sheet edges installation provides cylindrical form of the protective casing which is comprised of arch shaped metal sheets.

Electric connectors placement inside of the ring groove across each arch shaped edge of the sheets provides mechanical and electrical fixation of the metal sheets arch shaped edges.

Mounting of metal protective casing electric contacts on the external surface of the ring and their separate connection to the each electric connector provides each arch shaped metal sheet electric contact with a measurement instrument.

H-shaped cross-section form for dielectric washer and the ring provides reliable fixation of the edge for arch shaped metal sheets.

After insulation has been soaked up with heat carrier because of fistula origination radial clearance between the metal pipe and metal protective casing overall filling with thermal insulation allows detect electric resistance variance for thermal insulation and thus provide an accurate fistula location analysis.

Contour bent edges of the arch shaped metal sheets provide more reliable connection with electric connectors.

Beyond is the description for one of many possible device configurations for pipeline leakage detection, which are subordinate to an overall concept of invention, expressed in the following formula of the invention.

Description and accompanying drawings are illustrations for this invention which can not be regarded as limits for the volume of invention.

Various specific details are described intentionally for an overall comprehension of the invention. But in some cases well known or traditionally used parts are not defined here to keep description clear.

If other is not stated, all technical and scientific terms in this description have their meanings that are widely adopted among specialists engaged in the technical sphere of the invention.

This invention partially relates to the design of the nuclear power plant pipelines for water heat carrier or vapour transportation which pressure and temperature can exceed standard values for pressure and temperature of the air on the sea level. Technical solutions proposed here can be utilized in heat-and-power engineering, water supply, chemical and aerospace industries, specifically for pipeline and the other industrial equipment leakage detection.

Figure 2:
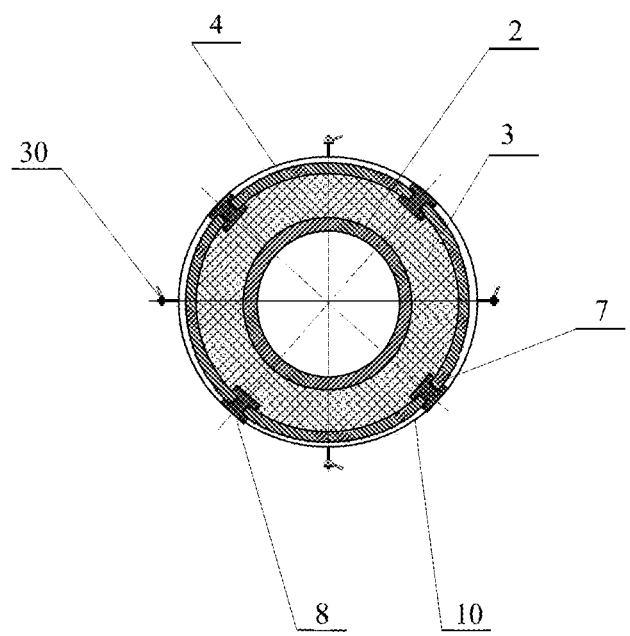
Figure 3:
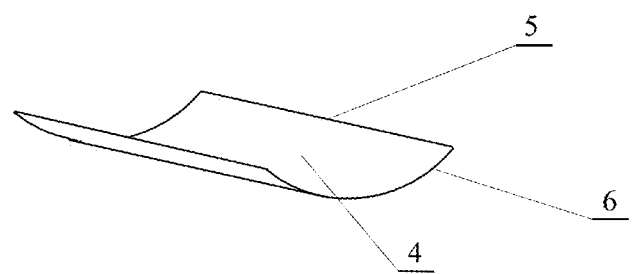
Figure 4:
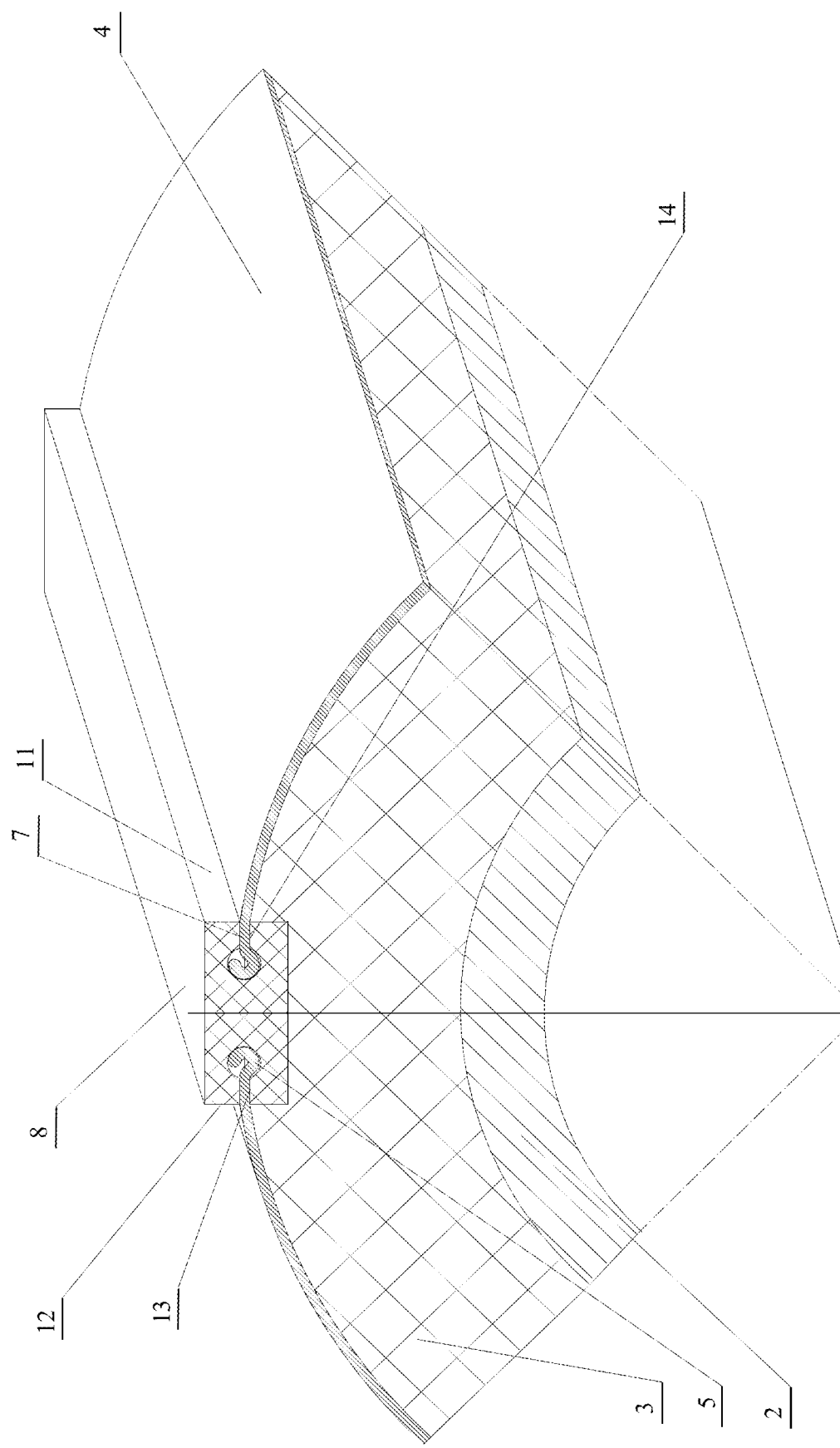
Figure 5:
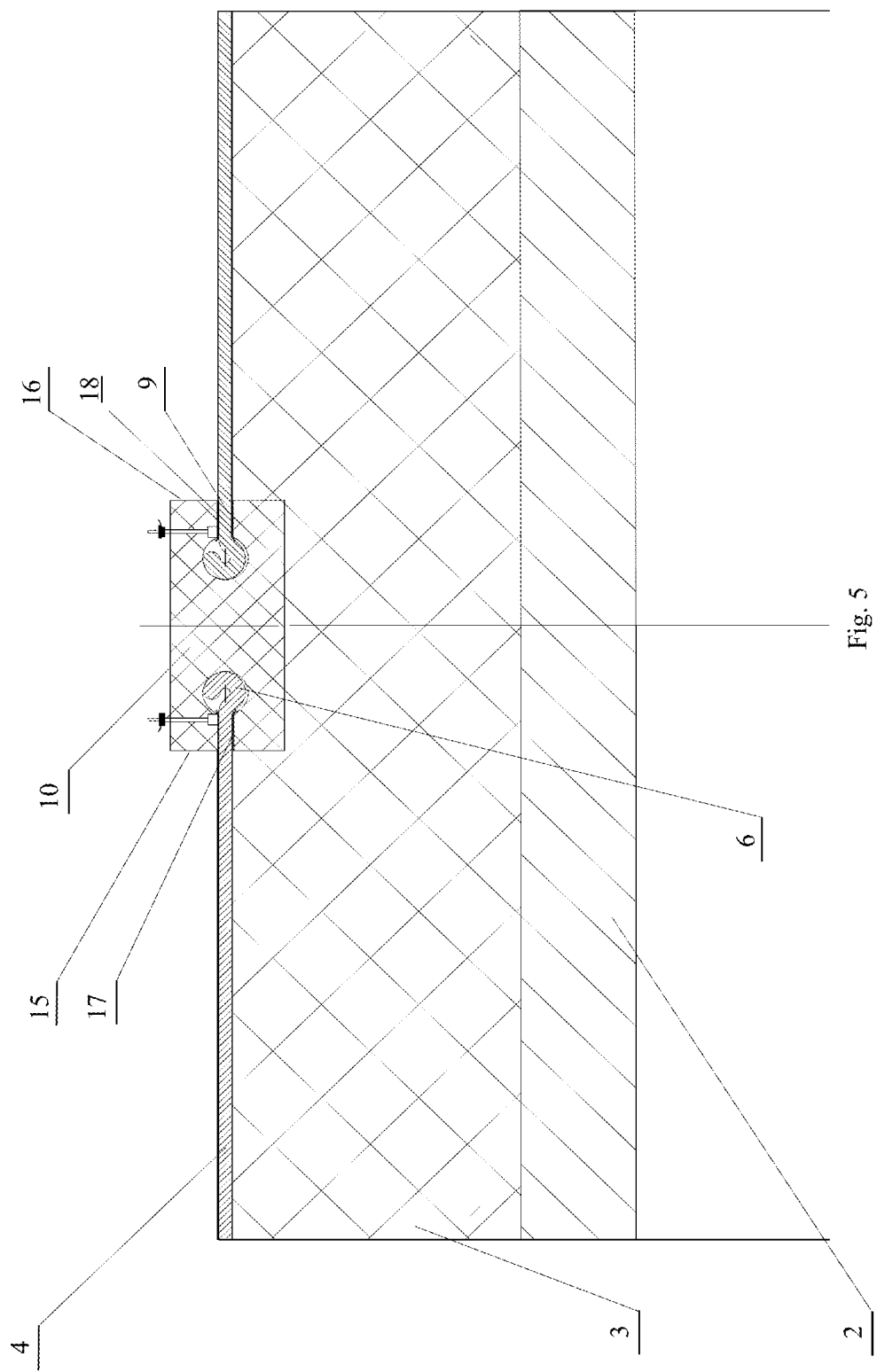
Figure 6:
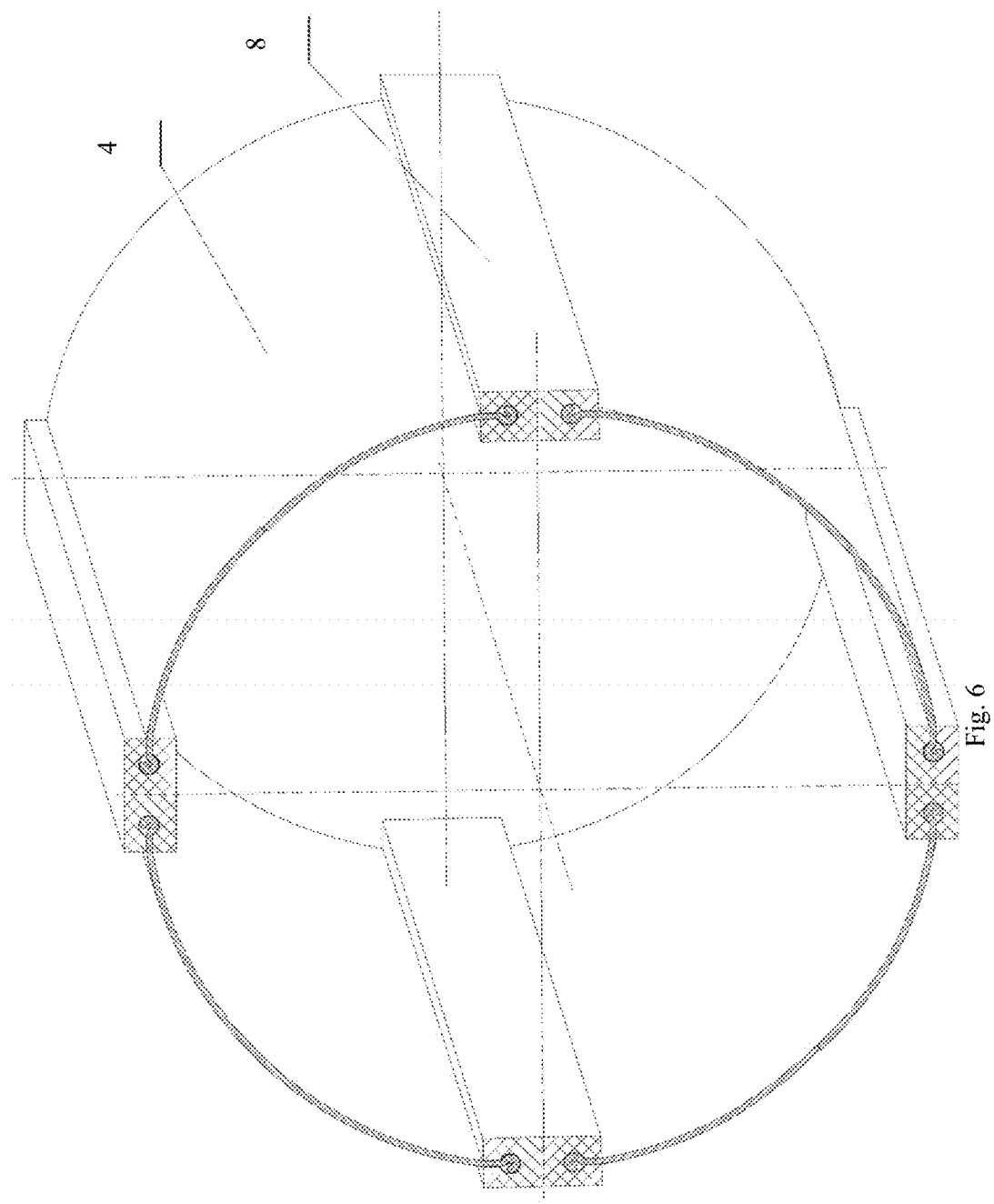

Invention is supported with several drawings, where:

FIG. 1 presents a longitudinal view of the pipeline controlled segment connected to a measurement instrument;

FIG. 2 presents the same case as FIG. 1, but its lateral view;

FIG. 3 presents one segment of the protective casing section;

FIG. 4 presents separable joint of the protective casing metal sheets straight line edges with dielectric washer;

FIG. 5 presents separable joint of the protective casing metal sheets arch shaped edges with dielectric ring;

FIG. 6 presents protective casing cylindrical compartment.

Figure 7:
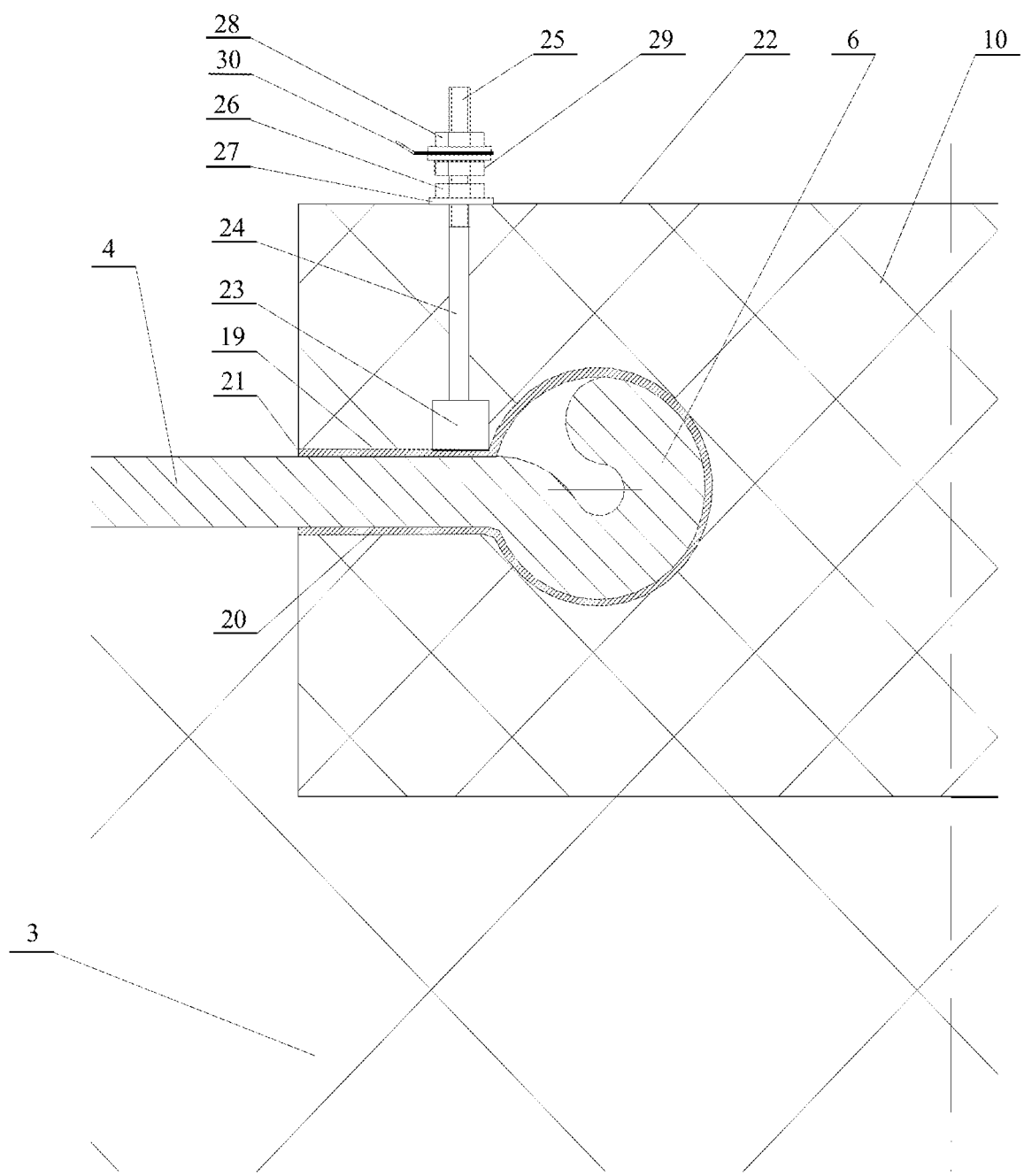
Figure 8:
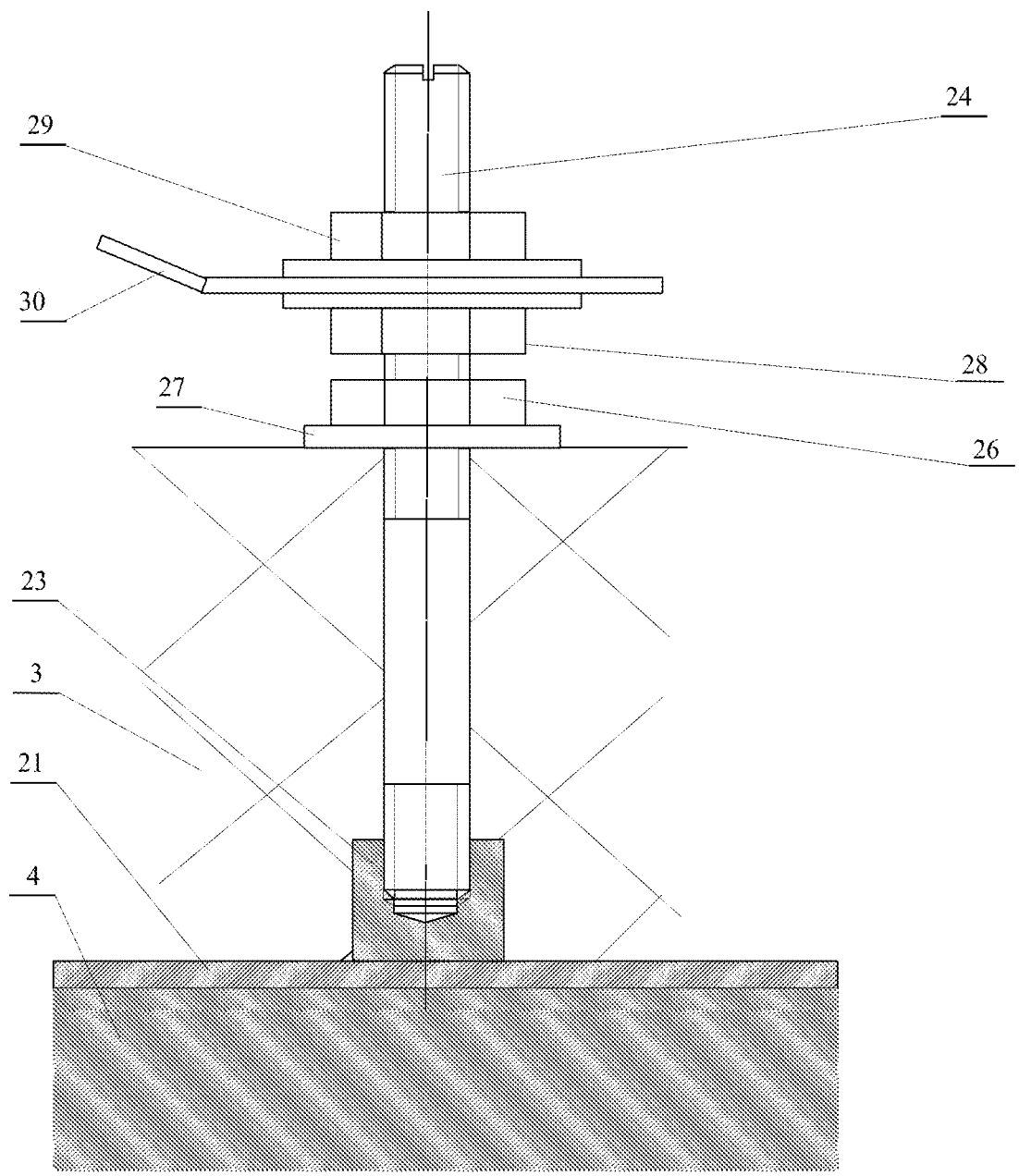

FIG. 7 presents electric connector design with electric conductor handler in the protective casing dielectric ring;

FIG. 8 presents electric cord handler design;

Pipeline leakage detection device comprises a metal protective casing coaxially installed with a radial clearance 1 on the main metal pipe 2. Clearance 1 between the metal pipe 2 and the protective casing is filled up with thermal insulation 3. Protective casing is composed of a set of joined arch shaped metal sheets 4 bent across the pipe 2. In this case the pipe 2 is fringed with four arch shaped metal sheets 4 performed as separate segments, which comprise four sections of the protective casing. Straight line edges 5 and arch shaped edges 6 of these metal sheets 4 are bent along their contour. Arch shaped metal sheets 4 straight line edges 7 which are mounted along the pipe 2 are joined with each other by means of a straight line dielectric washer 8. Metal sheets 4 arch shaped edges 9 are joined with each other by means of a dielectric ring 10 which is installed on the pipe 2 concentrically. Four sections of the protective casing joined with each other comprise a cylindrical compartment that encloses the pipe 2. These cylindrical compartments that are successively joined with each other by means of arch shaped edges 9 and dielectric rings 10 make a protective casing body around the pipe 2. Washer 8 side walls 11 and 12 have straight line grooves 13 and 14 for installation of metal sheets 2 straight line bent edges 5 in these grooves 13 and 14. Ring 10 flanks 15 and 16 have ring grooves 17 and 18 for installation of metal sheets 4 arch shaped bent edges 6 in these ring grooves 17 and 18. Straight line grooves 13 and 14 in the washer 8 and ring 10 grooves 17 and 18 are H-shaped in cross-section. Each ring groove 17 and 18 across any metal sheet 2 arch shaped edge 9 has electric connectors installed for metal sheets 2 arch shaped bent edges 6 fixation. Electric connector is performed as a set of lamels 21 on parallel walls 19 and 20 of the ring grooves 17 and 18, which plates are bent in a U-shaped form. Lamels 21 have a pipe nut 23 installed on them from the side of the ring 10 external surface 22 which in its turn has a stud 24 screwed into it and a nut 26 with a washer 27 screwed on it from the other side 25 of the stud, which press it to a ring 10 external surface 22 and two lock nuts 28 and 29 with an electric terminal 30. In this case as the protective casing is performed as a joint of four sections, ring 10 external surface 22 has four pairs of electric terminals 30 evenly installed on the circle from the side of the arch shaped metal sheets. All rings 10 electric terminals 30 and metal pipe 2 terminal 31 are connected to the measurement instrument 33 by means of electric cords 32.

Device operates the next way. Measurement instrument 33 is permanently launched and all arch shaped metal sheets 4 along with the pipe 2 are under small potential, e.g. three volts. Pipe 2 terminal 31 is connected to the negative pole and metal sheets 4 terminals 30 are connected to the positive pole of the measurement instrument 33 power supply. Pipelines ordinarily operate without any leakages. Under these conditions heat carrier temperature is higher than that of ambient environment which leads to extinction of any excessive moisture from thermal insulation 3. Within short period of time after start of heat carrier supply through the pipe 2 the value of humidity of thermal insulation 3 becomes constant and does not change any more. Electric resistance values which are dependent of thermal insulation 3 humidity and system electric capacity: "metal sheet 4—thermal insulation 3—pipe 2" will also reach some constant values corresponding with the pipeline operation temperature. Measurement instrument 33 reveals that electric resistance and electric capacity between the pipe 2 and arch shaped metal sheets 4 around it are minimal.

In case of an unlikely leakage existence, which can emerge because of the pipe 2 metal corrosion or defective weld, heat carrier spreads from the pipe 2 into a thermal insulation 3. As thermal insulation 3 is airproof, heat carrier soaks into it or under relatively high temperature saturates heat carrier with its vapour which leads to significant enhancement in electric conductivity of thermal insulation 3 in the leakage point. Pipe 2—thermal insulation 3—metal sheets 4 loop closes-in and electric signal is transferred from pipe 2 through minimal thermal insulation 3 electric resistance by the shortest route to the closest arch shaped metal sheet 4 and later on through cords 32 to measurement instrument 33. As all protective casing arch shaped metal sheets 4 are electrically insulated from each other and are connected by their own electric cords 32 to a measurement device 33, this measurement instrument 33 accurately detects leakage under a specific sheet.

It is evident, that pipe 2 leakage detection accuracy depends on the dimensions of the separate metal sheets 4 that comprise the pipeline protective casing. The smaller is the square of the metal sheet 4, the better is the accuracy of the leakage detection. Therefore protective casing design must be thoroughly divided by sections.

It must be noted that proposed protective casing design of joined separate metal sheets 4 makes an access to the leakage location on the pipe 2 consistently easier and thus eases its repair. One metal sheet 4 can be easily detached from adjacent sheets because of metal sheets 4, dielectric washers 8 and dielectric rings 10 elasticity. For this purpose it is enough to grip inside a metal sheet 4 a little bit so that its straight line bent edges 5 were released from straight line grooves 13 and 14 on the washer 8 and bent arch shaped edges 6 were released from the ring 10 ring grooves 17 and 18. In order to repair the pipe 2 there is no need to stripe out thermal insulation 3 but only detach its part which has got soaked in the radial direction. This invention is especially important for repair of large diameter pipes 2 with thermal insulation.

Protective casing assembly is performed by means of arch shaped metal sheet 4 straight line edges 7 inside grip and entering of its straight line bent edges 5 into straight line grooves 13 and 14 on the washer 8 along with entering arch shaped bent edges 6 in the ring 10 ring grooves 17 and 18. While entering bent arch shaped edges 6 into the ring 10 ring grooves 17 and 18 it is needed to provide their successive reliable fixation and their electric contact with electric connector lamels 21. Metal sheets 4 joining with the washer 8 and the ring 10 is provided through metal sheets 4 bent edges 5 and 6 fixation by means of the washer 8 straight line grooves 13 and 14 walls along with the ring 10 ring grooves 17 and 18 walls.

Techno-economic effect brings maintenance simplification for thermal insulated pipelines covered with a protective casing.

The invention claimed is:

1. A pipeline leakage detection device comprising a metal protective casing coaxially mounted on a metal pipe with a radial clearance, and a measurement instrument with electric conductors electrically connected to the metal pipe via electric contacts on the metal protective casing for measurement of electric resistance in radial clearance environment, such that to improve accuracy of localization of a pipeline leakage point the metal protective casing having separate arch shaped metal sheet segments along the circumference of the metal pipe, wherein straight line edges of the arch shaped metal sheet segments along a longitudinal axis of the metal pipe are connected with each other by a dielectric washer and arch shaped sheet edges of the segments along the circumference of the metal pipe are connected with each other by a dielectric ring, wherein the dielectric ring having a ring groove on its flank for mounting the arch shaped sheet edges installation with the electric contacts in it for each arch shaped sheet edge fixation and the electric contacts installed on the outer surface of the dielectric ring which are connected to each electric connector separately.

2. The pipeline leakage detection device according to claim 1, wherein the dielectric washer and ring formed an H-shaped cross-section.

3. The pipeline leakage detection device according to claim 1, wherein the radial clearance between metal pipe and metal protective casing filled up with thermal insulation material.

4. The pipeline leakage detection device according to claim 1, wherein the arch shaped sheet edges of metal sheets are bent by contour.

* * * * *